US008250109B2

(12) United States Patent
Dallmeier et al.

(10) Patent No.: US 8,250,109 B2
(45) Date of Patent: Aug. 21, 2012

(54) PROCESSING VIDEO FILES USING METADATA AND TIME STAMP

(75) Inventors: Dieter Dallmeier, Pettendorf (DE); Hans-Dieter Schramm, Regensburg (DE); Ben Michael Schmidt, Regensburg (DE)

(73) Assignee: Dallmeier electronic GmbH & Co. KG, Regensburg (DE)

( * ) Notice: Subject to any disclaimer, the term of this patent is extended or adjusted under 35 U.S.C. 154(b) by 869 days.

(21) Appl. No.: 12/218,942

(22) Filed: Jul. 18, 2008

(65) Prior Publication Data
US 2009/0024619 A1 Jan. 22, 2009

(30) Foreign Application Priority Data

Jul. 20, 2007 (DE) .......................... 10 2007 034 010

(51) Int. Cl.
*G06F 7/00* (2006.01)
*G06F 17/30* (2006.01)
(52) U.S. Cl. ......... 707/802; 707/791; 707/756; 707/913
(58) Field of Classification Search .................... 348/70, 348/936; 707/609, 687, 705, 802, 791, 756, 707/913
See application file for complete search history.

(56) References Cited

U.S. PATENT DOCUMENTS

| 6,643,387 B1 | 11/2003 | Sethuraman et al. ......... 382/107 |
| 6,665,442 B2 | 12/2003 | Sekiguchi et al. ............ 382/224 |
| 8,145,656 B2* | 3/2012 | Shatz et al. .................... 707/758 |
| 2004/0223052 A1* | 11/2004 | Sugano et al. .................. 348/70 |
| 2005/0151671 A1* | 7/2005 | Bortolotto ....................... 340/936 |
| 2006/0215025 A1 | 9/2006 | Le Maigat et al. ............. 348/143 |
| 2007/0010329 A1* | 1/2007 | Craig et al. ..................... 463/42 |
| 2007/0203942 A1* | 8/2007 | Hua et al. ................... 707/104.1 |
| 2008/0049123 A1* | 2/2008 | Gloudemans et al. ........ 348/239 |
| 2008/0253623 A1* | 10/2008 | Hauke ............................ 382/118 |
| 2008/0263012 A1* | 10/2008 | Jones ................................ 707/3 |

FOREIGN PATENT DOCUMENTS
WO WO 2006/107997 4/2005

OTHER PUBLICATIONS

D. Chetverikov and J. Verestoy, "Tracking Feature Points: a New Algorithm," Computer and Automation Research Institute, Budapest, Kende u. 13-17, H-1111 Hungary (date unknown), 3 pages.

\* cited by examiner

*Primary Examiner* — Giovanna Colan
(74) *Attorney, Agent, or Firm* — Imperium Patent Works; Darien K. Wallace

(57) ABSTRACT

A method for processing video data involves receiving data from a series of images and analyzing the data to identify geometric forms. The forms are stored as metadata of a first data level and are linked by time stamps to the images in which the forms were identified. The metadata from an image and the previous image are compared, and delta metadata is generated from the difference. Delta metadata is also marked with time stamps. Metadata and delta metadata are analyzed, and objects are extracted from the geometric forms. The objects are stored as time-stamped metadata and delta metadata of a second data level. The process is repeated for higher data levels. A user inputs a database query to identify from among the stored input images that particular image sequence in which the extracted object is recorded. Queries started at higher data levels are quicker but less accurate.

20 Claims, 2 Drawing Sheets

PROCESSING VIDEO FILES USING METADATA AND TIME STAMP

CROSS REFERENCE TO RELATED APPLICATION

This application is based on and hereby claims the benefit under 35 U.S.C. §119 from German Patent Application No. DE 102007034010.0, filed on Jul. 20, 2007, in the German Patent Office, the contents of which are incorporated herein by reference. This application is a continuation of German Patent Application No. DE 102007034010.0.

TECHNICAL FIELD

The present invention relates to methods for processing video data and for searching the processed video data, and to devices for implementing methods of this type.

BACKGROUND

In video surveillance, not only monitoring an area is important, but also recording the video images. For example, when events in places frequented by large numbers of people, such as public squares, stadiums and traffic intersections, are automatically monitored using cameras, in addition to viewing the live images, recording the images is also of great importance. Due to the limited storage capacity of the monitoring systems, however, only a small number (approximately 1-5 frames per second) of the total number of captured images (approximately 50 frames per second) are recorded. Thus, the quantity of information available for evaluation is decreased. When event sequences in the location occur relatively rapidly, images of significant interest might not be recorded, causing them to be irretrievably lost. For example, the frames of a sequence captured at a traffic intersection that best allow detail to be recognized might not be stored for future analysis. Newer systems and compression algorithms have been developed that have significantly increased the rate at which the captured images can be recorded. Some newer systems even permit real-time recording in which all of the images captured by the camera are recorded. In addition, the capacity of the image archives has been increased.

Existing methods do not, however, permit the increased amount of video data stored in image archives to be optimally processed and evaluated. One known method of processing video data involves extracting basic elements (called primitives) from a video sequence and storing them along with the video sequence. Then the stored primitives, as opposed to the entire video sequence itself, are analyzed in order to search for an event. In order to locate the event, it is not necessary to analyze the entire video, but rather only the primitives that correspond to the video. This video processing method is described in WO 2006/107997 A2. Methods for decreasing the cost of processing the captured video data or for searching the processed video data, however, are not disclosed.

A method is sought for decreasing the cost of processing video data recorded in real-time and for searching the processed video data.

SUMMARY

A method for processing video data involves receiving video data from a series of images and analyzing the video data to identify simple geometric forms. The geometric forms are stored as metadata of a first data level and are linked by a time stamp to the video images in which the forms were identified. The metadata of the first data level of an image and the metadata of the first data level of a previous image are compared with one another. Delta metadata of the first data level of an image are generated from the differences between metadata of sequential images. The delta metadata of the first data level is marked with a time stamp and stored. The metadata and delta metadata are analyzed, and objects are extracted from the geometric forms. The extracted objects are stored as time-stamped metadata of a second data level. The process is repeated for higher data levels.

A user of the system inputs a database query in the form of configuration data that defines the event of interest. The system identifies from among the stored input images that particular image sequence in which the identified event is recorded. The format of the configuration data of a database query must be adapted to that of the metadata and delta metadata of the respective data levels. Queries can be initiated at any data level. Queries started at higher data levels are quicker but have a higher uncertainty of locating the desired image sequence. The user also indicates the maximum depth of the data levels that are to be analyzed. Ordinarily, the user performs the database query only on the highest database level.

The method of another embodiment for processing video data involves receiving video data of a sequence of images, each of which has a time stamp. The video data of each image is analyzed such that simple geometric forms are recognized in the video information of the image. The geometric forms of the image are stored as metadata in a first data level of the image. The metadata of the first data level of the image is marked with a time stamp that allows the simple geometric forms to be linked to the corresponding video data of the image. The metadata of the first data level of the image is analyzed such that objects among the recognized simple geometric forms are distinguished and identified. The identified objects are stored as metadata in a second data level of the image. The metadata of the second data level of the image is also marked with a time stamp that allows the identified objects to be linked to the corresponding video data of the image. The metadata of the first data level and the second data level of an image contains information on the simple geometric forms and the identified objects.

The metadata of the first data level of an image and the metadata of the first data level of a previous image are compared with one another. Delta metadata of the first data level of an image are generated from the differences between metadata of sequential images. The delta metadata of the first data level is marked with a time stamp and stored. The time stamp allows the delta metadata to be linked to the corresponding video data of the image.

The probability of accurately identifying objects is increased by generating metadata of a second data level of the image using both the metadata of the first data level of the image as well as the delta metadata of the first data level of an image. The delta metadata of the second data level of an image are compared with the delta metadata of the second data level of a previous image. Events in the video sequence are located using delta metadata of a third data level of the image by determining the differences in the delta metadata of the second data level. The delta metadata of the third data level of the image are marked with a time stamp that allows the delta metadata to be linked to the corresponding video data of the image.

In another embodiment of the video processing method, delta metadata for higher data levels of an image are generated by comparing the differences between metadata from higher data levels of an image and metadata from higher data levels of a previous image. The metadata and delta metadata of the various data levels of an image are generated in time-stamped temporal sequence. The time-stamped metadata and delta metadata then permit the processing of the video data to be performed using different control units at a different time and different location than where and when the video data was captured.

By generating and storing the metadata and delta metadata in such a way that they form an information tree, specific objects and events can be more quickly located. The metadata and delta metadata of the various data levels of a plurality of images are stored in a database or other computer-readable medium. The database contains all of the generated metadata and delta metadata of the various data levels of a plurality of images and thereby facilitates the searching and locating of specific structures.

In addition, devices are provided that are used to implement the above-described process. These devices are equipped with control units that can be configured as software or as hardware components.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
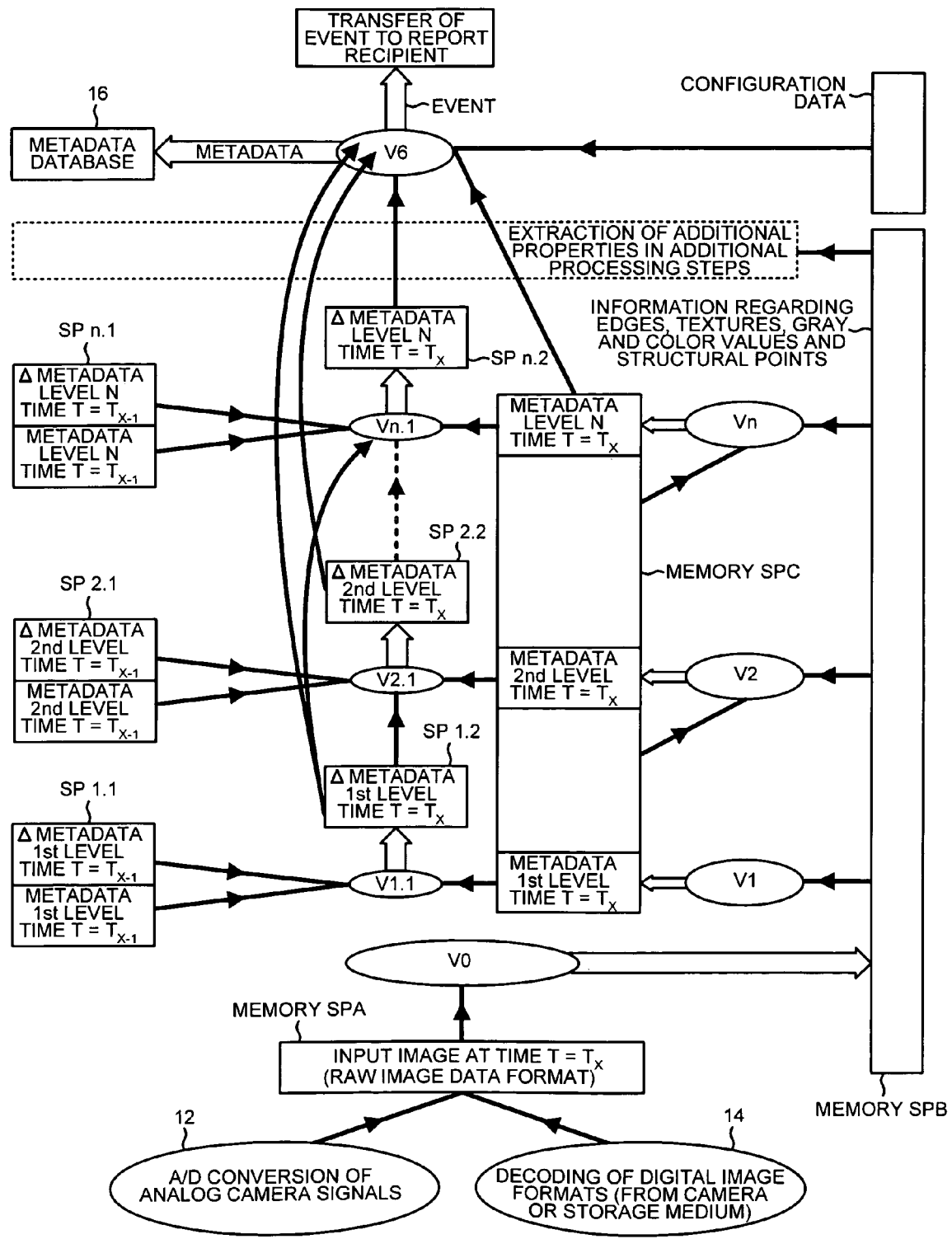
FIG. 1 is a diagram illustrating the hierarchy of data levels of an information tree used to process video data.

Reference will now be made in detail to some embodiments of the invention, examples of which are illustrated in the accompanying drawings.

A method for processing video data involves receiving video data of a sequence of images, each of which has a time stamp. The video data of each image are analyzed such that simple geometric forms are recognized in the video information of the image. The geometric forms of the image are stored as metadata in a first data level of the image. The metadata of the first data level of the image are marked with a time stamp that allows the simple geometric forms to be linked to the corresponding video data of the image.

The metadata of the first data level of the image are analyzed such that objects among the recognized simple geometric forms are distinguished and identified. The identified objects are stored as metadata in a second data level of the image. The metadata of the second data level of the image are also marked with a time stamp that allows the identified objects to be linked to the corresponding video data of the image. The simple geometric forms are, for example, circles, ellipses, triangles (equilateral, isosceles or right triangles), quadrilaterals, such as squares, rectangles and rhombi, and other polygons. On the other hand, objects are composed of two or more simple geometric forms and form two-dimensional or three-dimensional structures. Examples of identified objects include inanimate objects, such as a suitcase or automobile, and bodies of a plant, animal and human life forms. In this specification, terms "structure" and "structures" include both the simple geometric forms and objects.

The metadata of the first data level and the second data level of an image contains information on the simple geometric forms and the objects. Such information includes dimensions, color and position. The metadata thereby provides an initial characterization of the fundamental structures in the image.

The analysis of video data of an image takes place in multiple stages. The analysis can therefore be performed at different times and in different locations using control units, such as processors, that are independent of one another. To decrease processing costs, video data of two or more sequential images are compared with one another for the purpose of dividing the video data from an image into a static component and a dynamic component. Because the static component of sequential images does not change, it is unnecessary to analyze the corresponding data from the static component of sequential images more than once, thereby decreasing the cost of processing.

The metadata of the first data level of an image and the metadata of the first data level of a previous image, or a plurality of previous images, are compared with one another. Delta metadata of the first data level of an image are generated from the differences between metadata of sequential images. The delta metadata of the first data level are marked with a time stamp and stored. The time stamp allows the delta metadata to be linked to the corresponding video data of the image. The time stamped delta metadata provides information regarding the direction of movement, the change in the direction of movement, the duration of movement, and the speed and change in speed of the simple geometric forms.

The metadata of the second data level of an image and the metadata of the second data level of the previous image, or a plurality of previous images, are also compared with one another. From the differences in compared metadata, delta metadata of the second data level of the image are also generated and stored. The delta metadata of the second data level of the image are also marked with a time stamp that allows the delta metadata to be linked to the corresponding video data of the image. The time stamped delta metadata of the second data level provides additional information regarding the direction of movement, change in direction of movement, the duration of movement, the speed and change in speed of the objects. The probability of accurately identifying objects is increased by generating the metadata of the second data level of the image using both the metadata of the first data level of the image as well as the delta metadata of the first data level of an image.

The delta metadata of the second data level of an image are compared with the delta metadata of the second data level of a previous image or of multiple previous images. Events in the video sequence are distinguished using delta metadata of a third data level of an image by determining the differences in the delta metadata of the second data level. The delta metadata of the third data level of the image are marked with a time stamp that allows the delta metadata to be linked to the corresponding video data of the image.

The delta metadata identifies movement in objects and allows events in the video sequence to be located. For example, the movement of identified objects allows the location in a video sequence of searched events to be found, such as the placement of a suitcase in a critical location or the forceful opening of a door. In this specification, the term "structure" is also used to describe the characteristics of an event in a video sequence.

The probability of accurately identifying events in a video sequence is increased by generating the metadata of the third data level of the image using the metadata of lower data levels of the image as well as the delta metadata of the lower data levels of the image. Metadata of higher data levels of an image are generated using the metadata of lower data levels of the image and from the delta metadata of lower data levels of the image. The metadata of higher data levels of the image have greater informational content. The metadata of higher data levels is also stored on a computer-readable medium and is marked with a time stamp that allows the metadata to be linked to the corresponding location of the image in the video sequence. By generating first, second and higher data levels of metadata, a multi-layered information structure is created that facilitates the selective and rapid search in a video sequence for the location of a specific object or event.

In another embodiment of the video processing method, metadata from higher data levels of an image and metadata from higher data levels of a previous image, or from a plurality of previous images, are compared with one another. From the differences in the compared metadata, delta metadata for higher data levels of the image are generated and stored.

The metadata and delta metadata of the various data levels of an image are generated in time-stamped temporal sequence. The time-stamped metadata and delta metadata then permits the processing of the video data to be performed using different control units at a different time and different location than where and when the video data was captured. Structures are then subsequently searched for. In the subsequent search for and locating of a specific object or event, the relevance of the located structure is assessed using probability data associated with the metadata and delta metadata of the various data levels of the image. The probability data indicate the degree of accuracy of the identification of the located structures.

As compared to the metadata and delta metadata for lower data levels of an image, metadata and delta metadata for higher data levels of an image contain additional data that characterize the identified structures. The located structures are specified by comparing the metadata and delta metadata of higher data levels of an image with the metadata and delta metadata of lower data levels of the image. Thus, for example, the metadata and delta metadata of higher data levels of an image contain information regarding the optical and structural surface condition of the identified structures. For example, the metadata and delta metadata indicate the color of the identified structure and whether the surface is matt or glossy, wet or dry, flat or wavy, and convex or concave.

By generating and storing the metadata and delta metadata of the data levels of an image in such a way that they form an information tree, the selective and rapid search for and locating of specific objects and events is facilitated. The degree of characterization of an identified structure provided by the metadata and delta metadata of the data levels of an image increases beginning with the first data level, which is comparable to the trunk of the information tree, to the higher data levels, which are comparable to branches of the information tree.

The metadata and delta metadata of the various data levels of a plurality of images are stored in a database or other computer-readable medium. The database contains all of the generated metadata and delta metadata of the various data levels of a plurality of images, and thereby facilitates the searching and locating of specific structures.

The number of structures that are to be located and that are to be stored as metadata and delta metadata in the various data levels of an image are reduced by establishing parameters having predetermined properties. For example, if the structure "person" is assigned the parameter "black hair," then corresponding metadata and delta metadata for persons having black hair are generated and stored, whereas no metadata and delta metadata are generated for persons having blond hair. The method for processing video data enables information from a multitude of images to be structured and stored in such a way that the quantity of data to be archived is reduced and the locating of predetermined structures is simplified.

Whereas the preceding discussion focused on preparing and storing information from a plurality of images, the locating of predetermined structures from the archived data will be discussed below. A process for locating objects and events in images from a video sequence includes defining structures to be searched for. The structures are defined by metadata and delta metadata of one or more data levels of the images. Parameters are defined that more closely characterize the structures to be searched for. The defined structures and parameters are converted to data in a format that corresponds to that of the stored metadata and delta metadata for each specific data level of the images. The stored metadata and delta metadata that correspond to the converted data from the structures and parameters are found in the images. The stored metadata and delta metadata that correspond to the structures to be searched for are then allocated to the associated image or sequence of images of the video data.

The process distinguishes between target parameters and possible parameters. The process determines whether the defined parameters are target parameters or possible parameters. If a defined parameter is a target parameter, only those structures exhibiting the associated parameter are found. For example, if a target parameter is "black hair" of a person, only persons having black hair are found. In the case of a possible parameter, however, structures not exhibiting the associated parameter are found as a superset, and structures exhibiting the parameter are found as a subset. For example, if a possible parameter is "black hair" of a person, persons having any hair color are found as a superset, and persons having black hair are found as a subset.

In addition, it is possible to preset a probability that indicates the degree of accuracy of the identification of the structure being searched for. Only those structures whose determined probability is equal to or greater than the preset probability are found. Structures whose determined probability is lower than the preset probability are not taken into account in the search, thereby reducing computing cost. A further decrease in cost results from performing the search within the framework of a preset time window. Video data with time stamps outside of the preset time window are not considered.

The search for metadata and delta metadata that correspond to the data of the defined structures and parameters is performed in the order of the sequential data levels of metadata and delta metadata for an image, beginning with the highest possible data level. Thus, only the outer areas of the information tree, i.e., the branches, are searched for the various structures and parameters, resulting in a further cost reduction. For example, in the case of the search for a person having black hair, those areas of the computer-readable medium in which only the corresponding information can be stored are selectively accessed. Other areas that involve persons having a hair color other than black are bypassed.

In order to reduce expense, it is also possible to preset the maximum data level at which the metadata and delta metadata of an image are to be searched. For example, if the data level two is preset, then only the metadata and delta metadata of the highest data level of an image down to the second data level will be searched for the defined structures and parameters.

FIG. 1 shows the hierarchy of the information tree used in the method for processing video data. FIG. 1 shows that the video data of a sequence of images to be processed are fed either from an analog camera or from a digital camera. The analog camera signals from the analog camera are first converted to digital camera signals by a device 12. Signals from a digital camera or an external digital storage medium are first received by device 14 for decoding the digital image formats. Signals from the analog-to-digital converter 12 or from the decoder 14 are received by the system for processing and searching video data.

The video data from device 12 or device 14 are intermediately stored in a memory SPA. The video data of the input image at time $t=t_x$ are stored in a raw image data format, where $t_x$ is the time at which the input image was recorded, and x is an integer that defines the sequence of the respective input images. The period during which the data is archived (the storage period) is freely selectable based upon the application and the capacity of the memory SPA. The resolution of the images or frames is variable. For purposes of simplicity, only the terms "image" and "images" are used in the following description. To allow the video data that is processed to be linked to one another, the data is marked with a time stamp. The memory SPA is controlled by a processor that is assigned to the memory SPA.

A device V0 is connected at its input side to the memory SPA and at its output side to a memory SPB. Device V0 uses structural point analysis, edge/texture analysis and color/gray value analysis to generate data from the digital data received from memory SPA. The received digital data includes data from an input image at time $t=t_x$ and from subsequent individual images. The data from the subsequent images correspond to the moved components and the non-moved components of the input images. The data from the different components of the respective individual images are stored in the memory SPB. Thus, memory SPB contains information regarding edges, textures, gray and color values and structural points of an input image at time $t=t_x$. Device V0 is controlled by a processor that is assigned to device V0.

For structural point analysis, a relevant structural point is a common local minimum or maximum of gray or color values in at least two axes. A structural point appears, for example, at corners of objects or at color transition points. Each structural point characterizes a part within the image being analyzed. The structural point either will always be located at the same point from one analysis to another analysis (static structural point) or will be re-located in the immediate vicinity of its last position (dynamic or moved structural point). In the latter case, a dynamic structural point can be tracked. Then, if a plurality of structural points having the same movement characteristic are present, it can be concluded that these structural points belong to the same object (feature point tracking). Dynamic structural points that belong to the same object are called feature points. Additional information on feature point tracking is described in "Feature Point Tracking Algorithms", Judit Verestóy and Dmitry Chetverikov, Image and Pattern Analysis Group, Computer and Automation Research Institute, Budapest, Kende, u. 13-17, H-1111 Hungary.

A device V1 is connected at its input side to the memory SPB and at its output side to a memory SPC. Device V1 has access to the data generated by device V0, which correspond to the moved component and the non-moved component of the input image at time $t=t_x$. Based upon the structure of the input image, three cases can be differentiated from one another.

First, the input image can contain a permanently nonmoving, static component, such as a component resulting from the image of a building. This component remains the same with each successive input image over an extended period of time, and therefore does not contain new information in terms of the respective individual images.

Second, the input image can contain a quasi-nonmoving, quasi-static component that results from something being removed from or added to the static component. An example of a quasi-nonmoving component is a package or a suitcase that is added at time $t=t_x$ to an area that is monitored. The quasi-static component of an input image is reassigned to the static component once a pre-determined time period has elapsed during which the object that was removed from or added to the area does not change.

Third, the input image may also contain a moving, dynamic component that is based on the movement of one or more objects within the monitored space. In one example, the dynamic component of an input image is formed by a passerby who was in motion at time $t=t_x$. It is understood that the dynamic and quasi-static components of an input image at time $t=t_x$ are of greater interest than the static component. Device V1 then accesses the components of the input image at time $t=t_x$ that are stored in the memory SPB, especially the dynamic and quasi-static components. Device V1 subjects the components to an edge analysis in order to extract graphic primitives, simple geometric forms (such as points, line segments, splines, polygons, circles and ellipses) and their sizes and positions. Device V1 converts the components to metadata of the first data level of an input image at time $t=t_x$ and stores the metadata in the memory SPC.

Following the elapse of a predetermined time period, the static component of an input image is also subjected to the above-described process. In one embodiment, the graphic primitives are extracted using a combination of edge analysis and color/gray value analysis in order to recognize the simple geometric forms in their entirety, i.e., in context. For example, if a tractor trailer with a white truck tarpaulin that has no recognizable surface structure is located within the area to be monitored, then using edge analysis only the outlines of the trailer would be visible. To fill in the unstructured area, in addition to the edge analysis, a color or gray value analysis is also performed. Device V1 is controlled by a processor that is assigned to device V1.

A device V1.1 is connected at its input side to the memory SPC and to a memory SP1.1. Device V1.1 is connected at its output side to a memory SP1.2. The metadata of the first data level of an input image at time $t=t_x$ are fed to device V1.1 from the memory SPC. The metadata of the first data level of an input image at time $t=t_{x-1}$, i.e., the metadata of the first data level of the preceding input image, are fed to device V1.1 from the memory SP1.1. Finally, the delta metadata of the first data level of an input image at time $t=t_{x-1}$, i.e., the delta metadata of the first data level of the preceding input image, are also fed to device V1.1 from the memory SP1.1.

From the supplied data, especially from the difference between the metadata of the first data level of an input image at time $t=t_x$ and the metadata of the first data level of an input image at time $t=t_{x-1}$, device V1.1 generates delta metadata of the first data level of an input image at time $t=t_x$. The delta metadata at time $t=t_x$ contains information regarding the direction of movement, the change in the direction of movement, the duration of movement and the speed and change in speed of the simple geometric forms. The delta metadata are marked with a time stamp that allows the metadata to be linked to the corresponding input image at time $t=t_x$. The delta metadata of the first data level of an input image at time $t=t_x$ that are generated by device V1.1 are stored in the memory SP1.2. Device V1.1 is controlled by a processor that is assigned to device V1.1.

The first data level of the system is formed by devices V1 and V1.1 and by memory units SP1.1 and SP1.2. The first data level of the system is the first data level at which data are processed by the system. The memory units SPB and SPC can be assigned to all data levels of the system.

Device V2 is connected at its input side to the memory SPB and to an area of the memory SPC, and at its output side to an additional area of the memory SPC. Device V2 has access to data generated by device V0, to information in the memory SPB, and to metadata in the memory SPC. Thus, device V2 has access to information regarding edges, textures, gray and color values, and structural points of an input image at time $t=t_x$ from the memory SPB. Device V2 also has access to the metadata of the first data level of the input image at time $t=t_x$ from the memory SPC.

Device V2 uses object segmentation and morphological operations to extract objects from the recorded data. Compared to structures such as simple geometric forms, the extracted objects characterize coherent areas that can have any structure. Device V2 extracts objects in a first process from the data of the graphic primitives that is obtained from the memory SPC. Device V2 also extracts objects in a second process from data that are obtained from the memory SPB. The first and second processes are independent of one another and can be implemented alternatively or in parallel (simultaneously or sequentially) as a safeguarding measure. The objects distinguished in this manner have not yet been classified or typed. Thus, it is unclear at this point in the process what type of object the extracted structure is. The form and position of the extracted objects within the input image, however, is fixed, as is the fact that structures are involved that in continued processing are to be viewed and treated as coherent blocks. The extracted objects are described by device V2 as metadata of the second data level of an input image at time $t=t_x$. The metadata of the second data level contain information regarding the form and position of the distinguished structures. The metadata are marked with the time stamp of the associated input image. The metadata of the second data level of an input image at time $t=t_x$ are output by V2 and are stored in the memory SPC. Device V2 is controlled by a processor that is assigned to device V2.

A device V2.1 is connected at its input side to the memory SPC and to a memory SP2.1. At its output side, device V2.1 is connected to a memory SP2.2. The metadata of the second data level of an input image at time $t_x$ are sent to device V2.1 from the memory SPC.

The metadata of the second data level of an input image at time $t=t_{x-1}$ are sent to device V2.1 from the memory SP2.1. The metadata at time $t=t_{x-1}$ corresponds to the metadata of the second data level of the preceding input image. The delta metadata of the first data level of an input image at time $t=t_x$ are sent to device V2.1 from the memory SP1.2. From the supplied metadata and delta metadata, especially from a difference between the metadata of the second data level of an input image at time $t=t_x$ and the metadata of the second data level of the input image at time $t=t_{x-1}$, device V2.1 generates delta metadata of the second data level of the input image at time $t=t_x$. The delta metadata of the second data level contains information regarding the direction of movement, the change in the direction of movement, the duration of movement, and the speed and change in speed of the extracted objects. The delta metadata is marked with a time stamp that allows the delta metadata to be linked to the corresponding input image at time $t=t_x$.

Device V2.1 generates the delta metadata of the second data level of the input image at time $t=t_x$. The delta metadata are stored in the memory SP2.2. Device V2.1 is controlled by a processor that is assigned to device V2.1.

The second data level of the system is formed by devices V2 and V2.1 and by the memory units SP2.1 and SP2.2. The second data level of the system is the second level at which data are processed by the system. After an arbitrarily determined number of intermediate levels, the nth data level is achieved with device Vn. Device Vn is connected at its input side to the memory SPB and to an area of the memory SPC. Device Vn is connected at its output side to another area of the memory SPC. Device Vn has access to the data in memory SPB generated by device V0, including information regarding edges, textures, gray and color values and structural points of the input image at time $t=t_x$. Device Vn also has access to the metadata of the preceding levels of the input image at time $t=t_x$ from the memory SPC.

Whereas a description of a region within an input image is contained in the second data level, properties relating to this region are processed in higher levels of the system. Thus, device V2 supplies a description of a region within an input image, including the location of a coherent area such as an object. Device Vn then determines the type or nature of the extracted object using the recorded data. Device Vn classifies the extracted object and determines the nature of the object using pattern recognition on the basis of neuronal networks. For example, device Vn determines whether the extracted object is a vehicle or a person. Information corresponding to the type of the identified object is converted by device Vn to metadata of the nth level of the input image at time $t=t_x$. The metadata is marked with the time stamp of the associated input image. The metadata of the nth level of the input image at time $t=t_x$ are output by Vn and are stored in the memory SPC. Device Vn is controlled by a processor that is assigned to device Vn.

A device Vn.1 is connected at its input side to the memory SPC and to a memory Spn.1 and to the memories of the preceding levels SP(n−1).2 to SP1.2. At its output side, device Vn.1 is connected to a memory SPn.2. Device Vn.1 receives the metadata of the nth level of the input image at time $t_x$ from the memory SPC. Device Vn.1 receives the metadata of the nth level of the input image at time $t=t_{x-1}$, as well as the delta metadata of the nth level of the input image at time $t=t_{x-1}$, from the memory SPn.1. The metadata and delta metadata at time $t=t_{x-1}$ corresponds to the metadata and delta metadata of the preceding input image. Device Vn.1 receives the delta metadata of the (n−1)th to the first data level of the input image from time $t=t_x$ from the memories SP(n−1).2 to SP1.2. Device Vn.1 generates delta metadata of the nth level of the input image at time $t=t_x$ using the supplied data, especially the difference between the metadata of the nth level of the input image at time $t=t_x$ and the metadata of the nth level of the input image at time $t=t_{x-1}$. The delta metadata of the nth level of the input image at time $t=t_x$ contains information regarding the direction of movement, the change in the direction of movement, the duration of movement, and the speed and change in speed of the classified objects. The delta metadata are marked with a time stamp that allows the delta metadata to be linked to the input image at time $t=t_x$. The delta metadata of the nth level of an input image at time $t=t_x$ are stored in the memory SPn.2. Device Vn.1 is controlled by a processor that is assigned to device Vn.1.

The nth data level of the system is formed by devices Vn and Vn.1 and by the memory units SPn.1 and SPn.2. As described above, between the second and nth levels are an arbitrary number of intermediate levels (not shown in FIG. 1) that are configured to correspond to the nth level and include a device Vm. Device Vm is connected at its input side to the memory SPB and to an area of the memory SPC. At its output side, device Vm is connected to an additional area of the memory SPC. A device Vm.1 is connected at its input side to the memory SPC, to a memory SPm.1 and to the memory units of the preceding levels SP(m−1).2 to SP1.2. Device Vm.1 is connected and at its output side to a memory SPm.2. Devices Vm and Vm.1 are controlled by a processor that is assigned to the respective devices Vm or Vm.1.

Data are accessed and processed in the intermediate levels, i.e., at the mth level, as in the other levels. For example, in the intermediate levels, it is determined how rapidly and in what direction an object is moving. Thus, metadata are defined using an image of the concrete physical units of the real world, whereas delta metadata are defined at the image processing level within the pixel range. The metadata and delta metadata of the intermediate levels also contain the time stamp of the associated input image at time $t=t_x$.

After the classification of the extracted objects in the nth level, additional, higher levels can be provided for the purpose of extracting additional properties, such as colors of an object or the characteristics of a vehicle or a person's face. The subsequent levels are configured to correspond to the nth level and have access to the metadata and delta metadata of the preceding levels, as well as to data from the memory units SPB and SPC. Devices of higher levels are again controlled by processors that are assigned to the respective devices.

As A device V6 that is connected at its input side to the memory SPC and to the memory units SPi.2 ($1 \leq n \leq i$) of all levels receives the metadata and delta metadata for all levels of an input image at time $t=t_x$. Device V6 outputs metadata and delta metadata to a database 16 to which it is connected at its output side. For simplification, only the memory for metadata is depicted in FIG. 1. Device V6 is also connected at its input side to a memory or other input device storing configuration data. The configuration data are permanently stored and represent search and filter criteria by which the metadata and delta metadata of the individual sequential images are to be searched. Examples of configuration data of this type include: red automobile; the first three letters of a license plate, such as M, U and B; automobile located on the Bavaria Circle in Munich on Jul. 4, 2007, between 16:00 and 17:00 hours. If the metadata and/or delta metadata that fulfill all search criteria are found, V6 generates a corresponding report and transfers the individual sequential images that fulfill the search criteria as an "event" to a display or other suitable output for a recipient of the report. The metadata and delta metadata for all levels are stored in database 16 in any case, regardless of whether or not the inspected individual images and their metadata and delta metadata fulfill the search criteria.

Figure 2:
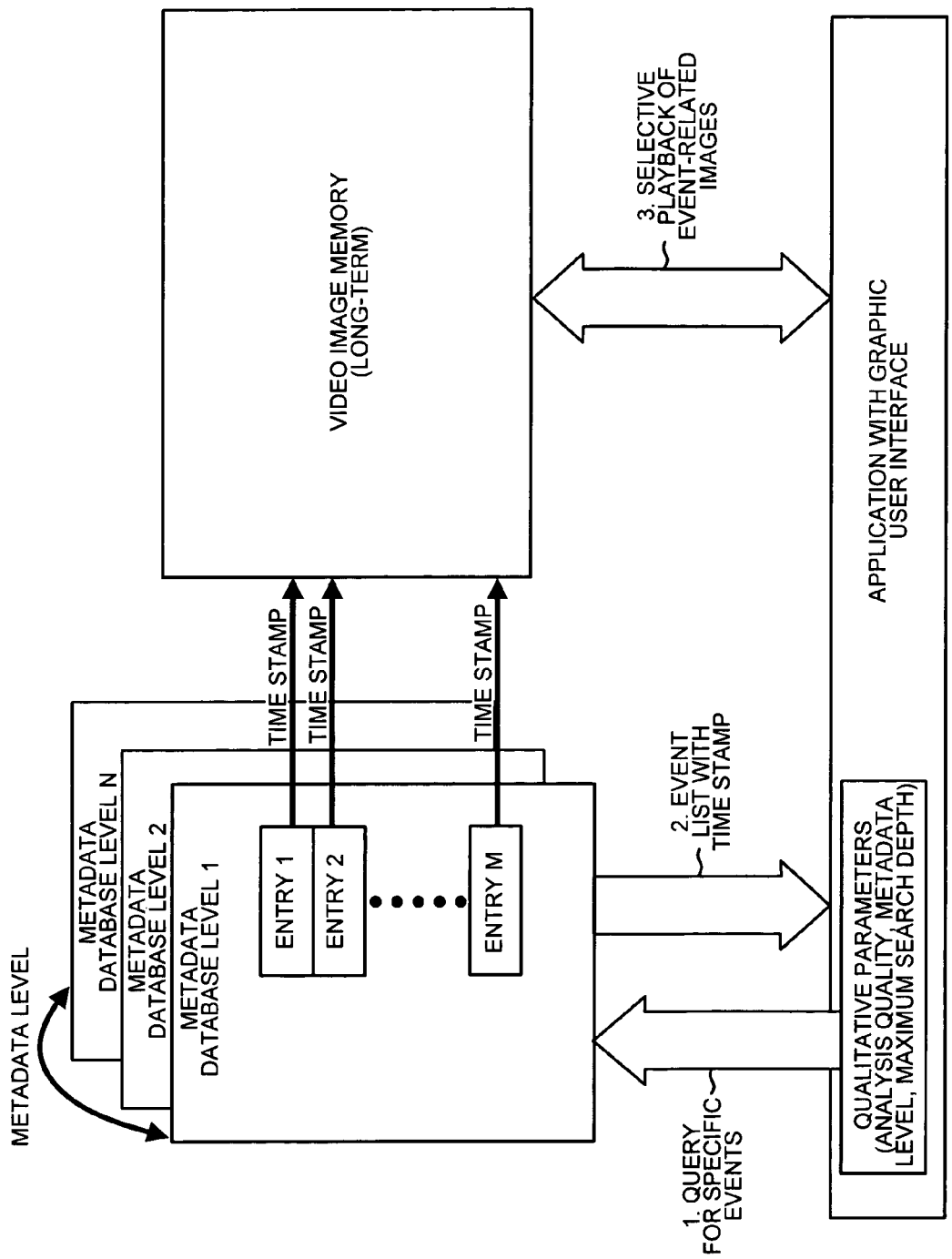
FIG. 2 is a diagram illustrating a query made to databases of metadata.

Whereas a first embodiment of the present invention according to FIG. 1 relates to analyzing sequential input images and immediately notifying the user when certain search criteria are fulfilled, a second embodiment shown in FIG. 2 searches for information in sequential input images that have already been analyzed. In the second embodiment of the present invention, a new database query is based upon a request for information that has just developed using configuration data to be defined. The user of the system inputs the currently configuration data, i.e., the event of interest, through a manual operator interface and initiates a database query to identify from among the stored input images that particular image sequence in which the identified event is recorded. The format of the configuration data of a database query must be adapted to that of the metadata and delta metadata of the respective data levels. The software that controls the user interface performs this adjustment.

The user indicates the data level or processing stage at which the database query should be started. The user also indicates the maximum search depth that is to be performed. Ordinarily, the user will determine that the database query should be begun at the highest data (or database) level, wherein the metadata and delta metadata stored in the database are examined for concurrence with the configuration data. Although databases in FIG. 2 are shown only for metadata, databases are also provided for delta metadata.

An answer to a user's query is generated the fastest for a database query that begins at the highest database level because the smallest amount of data must be processed. However, the degree of uncertainty is the greatest for a query answered using only the highest data level. For example, if an automobile with circular wheels and a trapezoidal body has been filmed from the side, then at the first data level the detection of two circles and a trapezoid will be obtained, whereas at the third level the statement will be received that the structure is an automobile. Experience has shown, however, that this statement can be false. If the answer appears to the user to be unsatisfactory or implausible, the user can reinitiate the same database query at a lower data level, in this case the second data level, to prevent a misinterpretation.

If data corresponding to the configuration data and search criteria of a database query have been found at one level, then precisely those video image sequences that are linked by the time stamp to the event are displayed from the video image memory on the user interface.

The second embodiment also can be used to detect the absence of an object and to display the associated video sequence that indicates the absence of the object. In one example, a palette loaded with goods disappears from a monitored storage room. The palette is described by its dimensions and whether it is a static object. Once a certain period of time has elapsed following its disappearance, however, the non-reappearing palette becomes an event that is characterized using the corresponding metadata and delta metadata. In response to the query for the event of a palette that has disappeared from the storage room, the data for the event are compared with the metadata and delta metadata stored in the database. The data for the input image in which the palette was last detected time are identified. To provide an overview of the entire event, including the presence and removal of the palette, it is necessary only for the length of the associated video image sequence, i.e., the time window that is of interest, to be appropriately selected.

In one or more exemplary embodiments, the functions described may be implemented in hardware, software, firmware, or any combination thereof. If implemented in software, the functions may be stored as one or more instructions on a computer-readable medium. Computer-readable media includes both computer storage media and communication media including any medium that facilitates transfer of a computer program from one place to another. A storage media may be any available media that can be accessed by a computer. Such storage media may be the databases of the data levels of FIGS. 1 and 2. In addition, such storage media may be program memory that is accessible by the processors assigned to memories SPA, SPB and SPC and to devices V0, V1, V2, Vm and Vn. Such storage media may be computer-readable media comprising RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for processing video data, comprising:
receiving video data of a sequence of images, wherein the video data is marked with a first time stamp;
comparing the video data of a first image to the video data of a preceding image such that a static component and a dynamic component of the first image are identified;
identifying a geometric form from the video data;
storing the identified geometric form as metadata of a first data level, wherein the metadata of the first data level are marked with a second time stamp that allows the geometric form to be linked to the video data of the first image, and wherein the metadata of the first data level contain information defining the dimensions, color and position of the identified geometric form;
extracting an object from the metadata of the first data level obtained from the identified geometric form; and
storing the extracted object as metadata of a second data level, wherein the metadata of the second data level are marked with a third time stamp that allows the extracted object to be linked to the video data of the first image.

2. The method of claim 1, further comprising:
comparing the metadata of the first data level to metadata of the first data level of the preceding image and from the difference generating delta metadata of the first data level, wherein the delta metadata of the first data level are marked with a fourth time stamp that allows the delta metadata to be linked to the video data of the first image.

3. The method of claim 2, wherein the delta metadata of the first data level contain information describing the geometric form taken from the group consisting of: a change in the direction of movement, and a duration of movement.

4. The method of claim 1, further comprising:
comparing the metadata of the second data level to metadata of the second data level of the preceding image and from the difference generating delta metadata of the second data level, wherein the delta metadata of the second data level are marked with a fourth time stamp that allows the delta metadata to be linked to the video data of the first image.

5. The method of claim 4, wherein the delta metadata of the second data level contain information describing the extracted object taken from the group consisting of: a direction of movement, a change in the direction of movement, a duration of movement, a speed and a change in speed.

6. The method of claim 2, wherein the metadata of the second data level are generated using the metadata of the first data level and the delta metadata of the first data level.

7. The method of claim 4, further comprising:
comparing the delta metadata of the second data level to delta metadata of the second data level of the preceding image and from the difference generating delta metadata of a third data level, wherein the delta metadata of the third data level describes an event that occurs in the sequence of images.

8. The method of claim 1, wherein metadata of a higher data level has a greater informational content than metadata of a lower data level.

9. The method of claim 1, wherein metadata of a higher data level and metadata of the higher data level of the preceding image are compared to each other and from the difference delta metadata of the higher data level are generated.

10. The method of claim 1, wherein the metadata of the first data level and the delta metadata of the first data level are generated in temporal sequence.

11. The method of claim 1, wherein the metadata of the first data level and the delta metadata of the first data level indicate a degree of accuracy of identifying the geometric form.

12. The method of claim 1, wherein the metadata of the first data level, the metadata of the second data level and metadata of a higher data level form an information tree.

13. The method of claim 2, wherein the metadata of the first data level and the delta metadata of the first data level are stored in a database.

14. A system for processing video data, comprising:
a software application;
a video image memory containing video data of a sequence of images; and
a database having a first data level and a second data level, wherein the software application receives the video data from the video image memory and compares the video data of a first image to the video data of a preceding image, wherein the software application identifies a geometric form from the video data, wherein the software application stores the identified geometric form as metadata of the first data level, wherein the metadata of the first data level are marked with a first time stamp that allows the geometric form to be linked to the video data of the first image in the video image memory, wherein the software application extracts an object from the metadata of the first data level and stores the extracted object as metadata of the second data level, and wherein the metadata of the second data level are marked with a second time stamp that allows the extracted object to be linked to the video data of the first image in the video image memory.

15. The system of claim 14, wherein the metadata of the first data level contain information defining the dimensions, color and position of the identified geometric form.

16. The system of claim 14, wherein the software application identifies a static component and a dynamic component of the first image by comparing the video data of the first image to the video data of the preceding image.

17. The system of claim 14, wherein the software application compares the metadata of the first data level to metadata of the first data level of the preceding image and from the difference generates delta metadata of the first data level, and wherein the delta metadata of the first data level contain information describing the geometric form taken from the group consisting of: a direction of movement, a change in the direction of movement, a duration of movement, a speed and a change in speed.

18. The system of claim 14, wherein the software application compares the metadata of the first data level to metadata of the first data level of the preceding image and from the difference generates delta metadata of the first data level, and wherein the metadata of the first data level and the delta metadata of the first data level indicate a degree of accuracy of identifying the geometric form.

19. The system of claim 14, wherein the metadata of the second data level has a greater informational content than does the metadata of the first data level.

20. The method of claim 1, further comprising:
setting probability data indicative of a degree of accuracy in extracting the object, wherein only those objects whose associated probability data exceeds a threshold are extracted.

* * * * *